United States Patent Office 3,366,492
Patented Jan. 30, 1968

3,366,492
PROCESS FOR MAKING LOW FAT SPREAD
Gordon D. Voss, La Grange, Ill., and Charles J. Rogers, Modesto, Calif., assignors to Armour and Company, Chicago, Ill., a corporation of Delaware
No Drawing. Filed Nov. 19, 1963, Ser. No. 324,827
3 Claims. (Cl. 99—123)

This invention relates to a new food product and a process for making the same. In particular, the food product of the invention is a spread primarily for table use which has a flavor, texture, consistency, and spreadability of butter or margarine but has considerably fewer calories. When the process of the invention is practiced the new food product results.

It is an object of the invention to provide a food product having a high nutritive value, which contains a sufficient amount of fat for the development of desirable physical characteristics, but which is dependent upon only small quantities of gelling agents.

Food products having a lesser fat content and having a different type of nutritive value than in the instant invention are known in the art. However, these low fat content food products require the addition of large amounts of nonfat milk solids or relatively large amounts of gelling agents. The new food product contains only slightly more nonfat milk solids, considerably more water and considerably less fat than are found in either butter or margarine. The food product of the invention provides about the same type of nutritive value as butter or margarine, but with about 50 percent less calories, while at the same time butter-like or margarine-like physical characteristics are attained.

It is an object of the invention to produce an inexpensive food product which has a flavor, texture, consistency, nutritive value, and spreadability similar to that of butter or margarine.

It is an object of the invention to provide a novel process for the production of a food product.

In practicing the process of the invention, milk, water, nonfat milk solids and gelling agents are first blended together. This is done in a temperature range of 150° to 180° F. (preferably 170° F.), to facilitate blending and solution of ingredients. For the sake of purity, the solution may be pasteurized at about 170° F. after addition of the ingredients. The pasteurized solution is then cooled to 80° F. or below before combination with the fat portion of the spread. A water in oil emulsion in the temperature range of 40° to 80° F., preferably containing large amounts of both large fat globules and free fat crystals of the type contained in butter or churned margarines, is then blended thereinto. The blend is then agitated at between 80° F. and 90° F. (preferably 85° F.) until the blend is homogeneous.

The food product of the invention contains about 24 percent to 60 percent of fat of the type described, 1 percent to 5 percent of nonfat milk solids, 0.3 percent to 1 percent gelling agent, and the remainder being essentially water, flavorings and coloring.

The physical properties of the fat employed in practicing the process and in forming the food product of the invention are important since they affect its consistency and texture. Water in oil emulsion fats containing a large amount of free fat crystals and large fat globules of the type found in butter and churned margarines give the desired consistency and texture. Water in oil emulsions, Votated margarines, and plasticized fats having large amounts of small agglomerated fat globules and small amounts of free fat crystals when employed in the process of the invention yield a product lacking the desired firmness and spreadability.

A typical margarine which can be employed as a basic ingredient is the one described in United States Patent No. 2,526,302, a churned margarine which is principally a water in oil emulsion containing large amounts of free fat crystals and large fat globules about 50 to 100 microns in size. The butter-like physical characteristics of the food product of the invention result from the employment of a fat having relatively large amounts of large fat globules and free fat crystals of the type found in butter and churned margarine. Although a large amount or proportion of free fat crystals tend to give brittle characteristics to butters, this does not occur in the food product of the invention because of the addition of a small amount of a gelling agent. In contrast to the employment of margarine base oils containing large amounts of fat globules 50 to 100 microns in size and small amounts of free fat crystals, it has been observed that employment of Votated margarines having a fat globule size of 15 to 25 microns, and moderate amounts of free fat crystals or Votated corn oil margarine with a fat globule size of 4 to 5 microns and very little free fat crystals, results in a food product having less firmness and a weaker body than the spreads prepared with churned margarine or butter. Consistency and texture of these spreads is similar to that of oil in water based salad dressing.

Another ingredient employed in the preparation of the food product is milk; the term "milk" is intended to include not only cows' milk in liquid form but also dried milk, skim milk, or the like. A range of about 1 percent to 5 percent nonfat dry milk solids are employable for the attainment of the desired results. Below about 1 percent level of nonfat dry milk solids a product results which does not have butter-like consistency, while above about the 5 percent level a pasty and gummy product results.

The desirable characteristics of the food product are maintained successfully when the range of the fat of the type herein described is maintained at between about 24 percent and 60 percent, the nonfat milk solids range is ordinarily about 1 percent to 5 percent, the protein range is about 1 percent to 3 percent, and the remainder is composed essentially of water. Below about the 24 percent fat level, the properties of fine homogenized salad dressings prevail. Above the 60 percent fat level a product which is relatively brittle, stiff and non-spreadable results.

Butter and margarine each include about 80 percent fat and 15 percent water and contain about 720 calories per 100 grams. The food product of the invention in one specific embodiment contains 38.64 percent fat, 4.84 percent nonfat milk solids, 1.71 percent protein, 54.81 percent water and contains about 360 calories per 100 grams, while having very similar physical characteristics to that of butter and margarine. It has a pH range of 6.9 to 7.1, but a pH range of 6.5 to 7.1 is satisfactory from a flavor standpoint. A typical formulation of the food product of this specific embodiment is shown below:

| | Percent |
|---|---|
| Butter or churned margarine | 47.3283 |
| Skim milk | 26.0000 |
| Water | 23.8583 |
| Nonfat dry milk solids | 1.4600 |
| Lecithin | 0.5000 |
| Carboxymethyl cellulose | 0.5000 |
| Low methoxy pectin | 0.2000 |
| Preservative (optional) | 0.1000 |
| Starter distillate | 0.0325 |
| Coloring (beta carotene) | 0.0200 |
| Vitamin fortification | 0.0009 |
| | 100.0000 |

In practicing the process of the invention, milk or the like and water are blended together while being heated to a temperature range of about 150° F. to 180° F., preferably to 170° F. A gelling agent, for example, carboxymethyl cellulose and low methoxy pectin used together, is is blended in either during or after the blending of the milk and water.

Alternatively, any one of the following gelling agents can be used at about the 0.5 percent level: methocel, locust bean gum, gum guar, karaya gum, and carrageenan. Preferably nonfat milk solids, salt, a suitable preservative such as sorbic acid, coloring matter such as beta carotene, and vitamins are also blended thereinto. For the purposes of purity the ingredient which have been blended together are preferably pasteurized, for example at a temperature of 170° F. for the required period of time. The solution is then cooled to 80° F. or below before the fat portion of the spread is added. Then butter, churned margarine, or the like, in the temperature range of 40° F. to 80° F. (preferably 70° F.), containing a water in oil emulsion having a large amount of free fat crystals and fat globules typically in the range of 50 to 100 microns in size is blended in along with the optional although desirable ingredients lecthin, starter distillate for flavoring, and vitamins. The blend is then agitated while the temperature is maintained between 80° F. and 90° F. (preferably 85° F.) until the blend is homogeneous. Above 90° F. the fat structure is destroyed and a brittle product results while between 70° F. and 80° F. the product develops a grainy character. Below 70° F. it is very difficult to form, resulting in a grainy texture which separates readily. The product is packaged and tempered to 40° F. The food product is then ready to be used. It is generally stored in the temperature range of 40° F. to −40° F.

Since the above-described embodiment and process are exemplary only, it will be understood that various modifications will be readily apparent to one skilled in the art to which the invention pertains. Accordingly, the invention is not to be considered as limited save as is consonant with the scope of the following claims.

What is claimed is:

1. The process of preparing a food product comprising the steps of blending, non-fat milk solids, gelling agent, and water in a temperature range of 150 to 180° F., cooling to not higher than 80° F., and blending in a water in oil emulsion containing large fat globules of about 50 to 100 microns in size and free-fat crystals while simultaneously maintaining the temperature between 80° F. and 90° F. until the blend is homogeneous, said components being added in quantities such as to provide in the final product between 1 and 5% non-fat milk solids, 0.3 to 1% gelling agent, and 24 to 60% fat.

2. The process of claim 1 wherein said water and oil emulsion is butter.

3. The process of claim 1 wherein said water and oil emulsion is churned margarine.

References Cited

UNITED STATES PATENTS

| | | | |
|---|---|---|---|
| 2,526,302 | 10/1950 | Turgasen | 99—123 |
| 2,617,730 | 11/1952 | Long et al. | 99—123 |

FOREIGN PATENTS

| | | |
|---|---|---|
| 4,412 | 1/1913 | Great Britain. |
| 574,389 | 1/1946 | Great Britain. |

OTHER REFERENCES

Journal of Dairy Science, vol. 45, No. 2, May 1962, p. 656.

MAURICE W. GREENSTEIN, *Primary Examiner.*

A. LOUIS MONACELL, *Examiner.*